United States Patent
Suh et al.

(10) Patent No.: US 12,314,620 B2
(45) Date of Patent: May 27, 2025

(54) IN-VEHICLE DISPLAY APPARATUS AND CONTROLLING METHOD THEREOF

(71) Applicants: Hyundai Motor Company, Seoul (KR); Kia Corporation, Seoul (KR)

(72) Inventors: Jung Seok Suh, Yongin-si (KR); Tae Un Kim, Seongnam-si (KR); Hong Gyu Lee, Goyang-si (KR); Ja Yoon Goo, Anyang-si (KR); Hae Seong Jeong, Busan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 86 days.

(21) Appl. No.: 18/060,277

(22) Filed: Nov. 30, 2022

(65) Prior Publication Data

US 2023/0229376 A1    Jul. 20, 2023

(30) Foreign Application Priority Data

Jan. 17, 2022 (KR) .................. 10-2022-0006425

(51) Int. Cl.
 *G06F 3/14* (2006.01)
 *B60R 1/22* (2022.01)
 *G06T 13/80* (2011.01)

(52) U.S. Cl.
 CPC .............. *G06F 3/1423* (2013.01); *B60R 1/22* (2022.01); *G06T 13/80* (2013.01)

(58) Field of Classification Search
 CPC .................................. G06F 3/1423; B60R 1/22
 See application file for complete search history.

(56) References Cited

U.S. PATENT DOCUMENTS

| | | | |
|---|---|---|---|
| 2008/0062008 | A1 | 3/2008 | Morimoto et al. |
| 2009/0222203 | A1* | 9/2009 | Mueller ............. G01C 21/3632 701/431 |
| 2013/0063676 | A1* | 3/2013 | Tsuchihashi ........ G02F 1/13318 349/54 |
| 2015/0186094 | A1* | 7/2015 | Ricci ....................... G06F 13/14 701/36 |
| 2016/0288705 | A1* | 10/2016 | Henon ................ G02B 27/0101 |
| 2020/0189466 | A1* | 6/2020 | Askeland ............. H04N 9/3185 |
| 2020/0406755 | A1* | 12/2020 | Davis ................ G02F 1/133603 |
| 2021/0125417 | A1 | 4/2021 | Ando |
| 2023/0365137 | A1* | 11/2023 | Tirla ..................... B60W 40/08 |

FOREIGN PATENT DOCUMENTS

| | | |
|---|---|---|
| JP | 2006035980 A | 2/2006 |
| JP | 2009115553 A | 5/2009 |
| JP | 2021052326 A | 4/2021 |
| WO | 2020026825 A1 | 2/2020 |

* cited by examiner

*Primary Examiner* — Terrell M Robinson
(74) *Attorney, Agent, or Firm* — Slater Matsil, LLP (57) ABSTRACT

An embodiment of a display apparatus includes a display panel provided within a vehicle and including a main display area and an edge display area disposed outside the main display area and an integrated controller configured to control the display panel, wherein the integrated controller includes a passenger behavior determining unit configured to determine whether a passenger uses the display panel, a driving state determining unit configured to determine a driving state of the vehicle, and an output controller configured to control a first driving display, corresponding to the driving state of the vehicle, to be outputted to the edge display area in response to a determination that the passenger uses the display panel.

20 Claims, 6 Drawing Sheets

IN-VEHICLE DISPLAY APPARATUS AND CONTROLLING METHOD THEREOF

CROSS-REFERENCE TO RELATED APPLICATIONS

This application claims the benefit of Korean Patent Application No. 10-2022-0006425, filed on Jan. 17, 2022, which application is hereby incorporated herein by reference.

TECHNICAL FIELD

The present disclosure relates to a display apparatus within a vehicle and a method of controlling the same.

BACKGROUND

Contents described in this part merely provide background information of embodiments of the present disclosure and do not constitute a conventional technology.

Recently, research on autonomous vehicles has been actively carried out. The autonomous vehicle automatically travels up to a destination even without a separate operation manipulation of a passenger, and thus a passenger can perform various tasks within the autonomous vehicle.

For example, a passenger may use a personal device, for example, a smartphone, may check information related to the driving of the vehicle by using a display apparatus provided within the vehicle, and may watch an image wanted by the passenger.

However, if the passenger continues to watch an image in the state in which the passenger does not recognize a driving state of the vehicle, a motion sickness symptom, such as vomiting or sickness, may occur in the passenger due to a mismatch between a movement felt by the body of the passenger and visual information.

Such a motion sickness symptom degrades ride comfort of the autonomous vehicle. Accordingly, the passenger needs to easily recognize information related to the driving of the vehicle although the passenger watches an image.

SUMMARY

The present disclosure relates to a display apparatus within a vehicle and a method of controlling the same. Particular embodiments relate to a display apparatus within a vehicle for preventing motion sickness of a passenger and a method of controlling the same.

Accordingly, embodiments of the present disclosure can solve problems in the art, and include providing a display apparatus within a vehicle, which can increase ride comfort of a passenger while minimizing an influence on an image watched by the passenger and a method of controlling the same.

At least one embodiment of the present disclosure provides a display apparatus comprising at least one display panel provided within a vehicle and comprising a main display area and an edge display area disposed outside the main display area and an integrated control unit controlling the at least one display panel, wherein the integrated control unit comprises a passenger behavior determining unit determining whether a passenger uses the at least one display panel, a driving state determining unit determining a driving state of the vehicle, and an output control unit controlling a first driving display, corresponding to the driving state of the vehicle determined by the driving state determining unit, to be outputted to the edge display area if it is determined that the passenger uses the at least one display panel by the passenger behavior determining unit.

Another embodiment of the present disclosure provides a vehicle comprising the display apparatus described above.

Another embodiment of the present disclosure provides a method of controlling at least one display panel provided within a vehicle and comprising a main display area and an edge display area disposed outside the main display area, the method comprising a determination process of determining whether a passenger uses the at least one display panel and a driving state of the vehicle and an output control process of controlling a first driving display, corresponding to the driving state of the vehicle, to be outputted to the edge display area if it is determined that the passenger uses the at least one display panel.

As described above, according to the present embodiments, there are effects in that ride comfort of a passenger can be increased while minimizing an influence on an image watched by the passenger.

DETAILED DESCRIPTION OF ILLUSTRATIVE EMBODIMENTS

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or the sequence of the components. Throughout this specification, when parts "include" or "comprise" a component, they are meant to further include other components, not excluding thereof unless there is a particular description contrary thereto.

Figure 1:
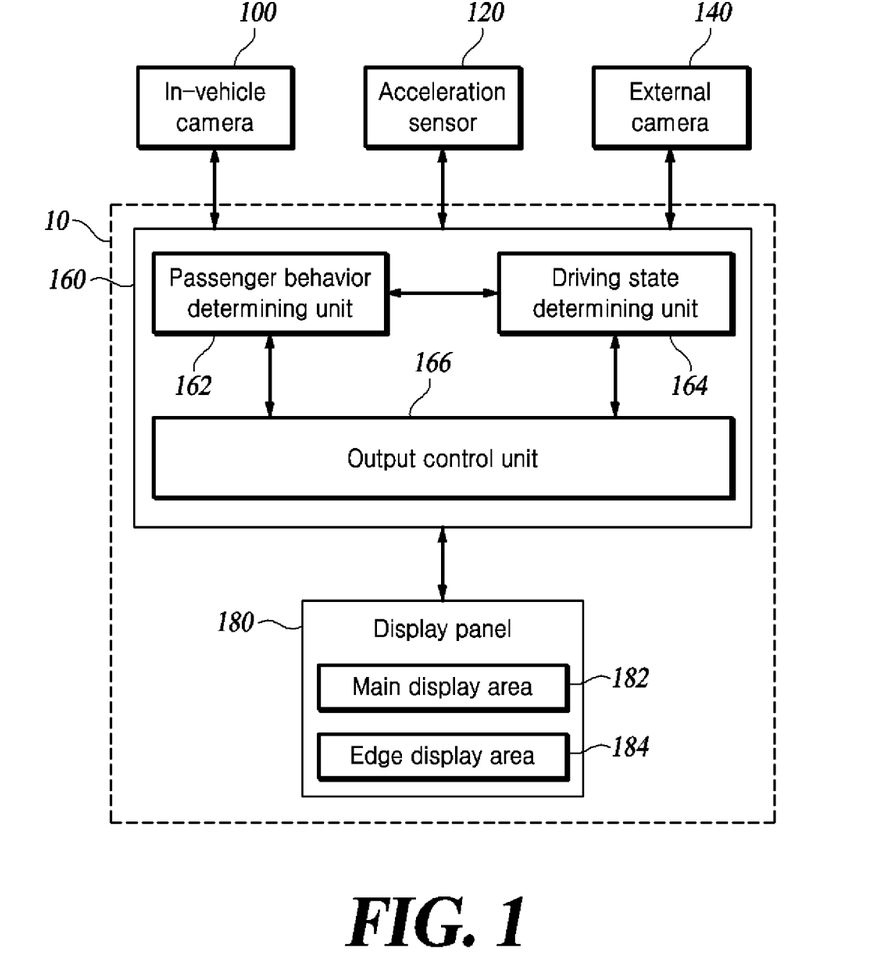
FIG. 1 is a block diagram of a vehicle including a display apparatus within the vehicle according to an embodiment of the present disclosure.

FIG. 1 is a block diagram of a vehicle including a display apparatus within the vehicle according to an embodiment of the present disclosure.

Figure 2A:
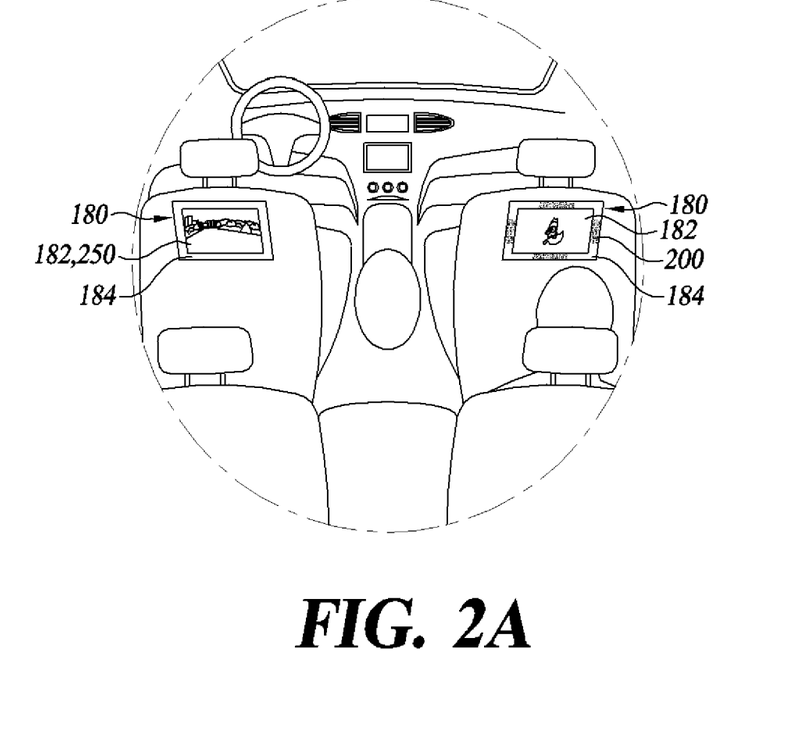
FIGS. 2A and 2B are diagrams illustrating driving displays outputted to the display apparatus depending on whether the display apparatus is used by a passenger according to an embodiment of the present disclosure.
Figure 2B:
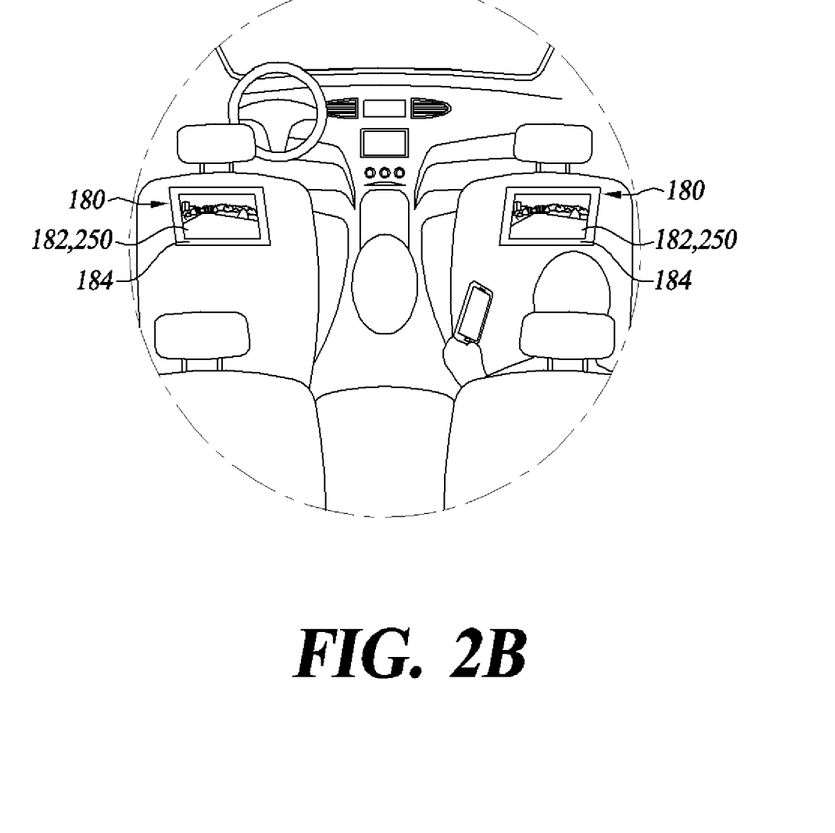

FIGS. 2A and 2B are diagrams illustrating driving displays outputted to the display apparatus depending on whether the display apparatus is used by a passenger according to an embodiment of the present disclosure.

Referring to FIGS. 1, 2A and 2B a display apparatus 10 according to an embodiment of the present disclosure includes some or all of a display panel 180 and an integrated control unit 160.

At least one display panel 180 is constituted and provided within a vehicle. For example, as illustrated in FIGS. 2A and 2B, at least one display panel 180 may be mounted on a back surface of a passenger seat of the vehicle. If a plurality of display panels 180 is constituted, the display panel 180 may also be mounted on a back surface of a driver seat.

However, a location where the display panel 180 is mounted is not essentially limited to the above locations as long as the display panel 180 is mounted at a location where a passenger can suitably watch the display panel 180.

The display panel 180 may include a main display area 182 and an edge display area 184.

The main display area 182 may occupy a central part of the display panel 180. The edge display area 184 may be disposed outside the main display area 182 and may occupy an edge portion of the display panel 180.

In this case, a first driving display 200 may be outputted to the edge display area 184. A second driving display 250 to be described later may be outputted to the main display area 182.

In this case, the first driving display 200 and the second driving display 250 may be displays corresponding to driving states of the vehicle. A driving state of the vehicle may be determined by a driving state determining unit 164. Accordingly, a passenger may recognize a driving state of the vehicle based on the first driving display 200 and/or the second driving display 250.

The first driving display 200 may be implemented by using a change in at least one of a location, angle, and size of a gradation color displayed in an upper area, lower area, left area, and right area of the display panel 180.

For example, the location of the gradation color may be moved upward, downward, left, and right on the edge display area 184 based on a driving state of the vehicle. The size of the gradation color may be increased or decreased up, down, left, and right. Accordingly, a passenger may recognize a driving state of the vehicle based on a change in the gradation color, which will be described in detail later.

The second driving display 250 may be implemented by using a change in at least one of a location, angle, and size of a driving image displayed in the main display area 182. In this case, the driving image may be an image using at least one of an external image captured by an external camera 140 of the vehicle and a preset background image.

For example, the driving image may be an image generated by combining external images captured by a plurality of external cameras 140 and may be an image generated by combining a preset background image and a captured image of the external camera 140.

Furthermore, the location of the driving image may be moved up, down, left, and right on the main display area 182 based on a driving state of the vehicle. The size of the driving image may be increased or decreased up, down, left, and right. Accordingly, a passenger may recognize a driving state of the vehicle based on a change in the driving image, which will be described in detail later.

FIG. 2A is a diagram illustrating a case where a passenger uses at least one of a plurality of display panels 180. In this case, an image selected by the passenger may be outputted to the main display area 182 of the display panel 180 used by the passenger. The first driving display 200 may be outputted to the edge display area 184.

FIG. 2B is a diagram illustrating a case where a passenger does not use at least one of a plurality of display panels 180. In this case, the second driving display 250 may be outputted to the main display areas 182 of the plurality of display panels 180.

FIG. 2B illustrates that the first driving display 200 is not outputted to the edge display area 184, but is not essentially limited thereto. The first driving display 200 may be outputted to the edge display area 184 although the second driving display 250 is outputted to the main display area 182.

The integrated control unit 160 controls at least one display panel 180. For example, the integrated control unit 160 may control a display outputted to the display panel 180.

Accordingly, the integrated control unit 160 may include a passenger behavior determining unit 162, the driving state determining unit 164, and an output control unit 166.

The passenger behavior determining unit 162 determines whether a passenger uses at least one display panel 180. The passenger behavior determining unit 162 may determine whether a passenger uses at least one display panel 180 by using an in-vehicle camera 100 and/or an eye sensor (not illustrated) of the vehicle.

For example, the passenger behavior determining unit 162 may determine whether a passenger uses at least one display panel 180 and uses a personal device by using a gaze of the passenger displayed in a captured image of the in-vehicle camera 100 and/or a gaze of the passenger detected by the eye sensor.

However, separately from the aforementioned example, if a passenger manipulates the display panel 180, the passenger behavior determining unit 162 may determine that the passenger uses at least one display panel 180 by detecting the manipulation.

The driving state determining unit 164 determines a driving state of the vehicle. The driving state determining unit 164 may determine a driving state of the vehicle by using an acceleration value measured by an acceleration sensor 120 of the vehicle and/or a driving control value based on autonomous driving control.

For example, the driving state determining unit 164 may determine a right turn, a left turn, deceleration, acceleration, etc. of the vehicle by using acceleration and deceleration of the vehicle in a pitch, roll, or yaw direction, which is measured by the acceleration sensor 120, and may determine a right turn, a left turn, deceleration, acceleration, etc. of the vehicle by using a driving prediction value calculated by a separate control unit for autonomous driving.

The output control unit 166 may control a display to be outputted to the display panel 180. For example, if it is determined by the passenger behavior determining unit 162 that a passenger uses at least one display panel 180, the output control unit 166 may control the first driving display 200 to be outputted to the edge display area 184. At this time, the output control unit 166 may control an image, selected by the passenger, to be outputted to the main display area 182.

Furthermore, if it is determined by the passenger behavior determining unit 162 that a passenger does not use at least one display panel 180, the output control unit 166 may control the second driving display 250 to be outputted to the main display area 182.

If the display panel 180 is constituted in plural, if it is determined by the passenger behavior determining unit 162 that a passenger uses at least one display panel 180, the output control unit 166 may control the second driving display 250 to be outputted to the main display areas 182 of the remaining display panels 180 except the display panel 180 used by the passenger. At this time, the output control unit 166 may control an image, selected by the passenger, to be outputted to the main display area 182 of the display panel 180 used by the passenger, and may control the first driving display 200 to be outputted to the edge display area 184.

However, if it is determined by the passenger behavior determining unit 162 that a passenger does not use the plurality of display panels 180, the output control unit 166 may control an image, selected by the passenger, to be outputted to the main display areas 182 of all the display panels 180, and may control the first driving displays 200 to be outputted to the edge display areas 184.

Hereinafter, an embodiment of a method of recognizing, by a passenger, a driving state of the vehicle through the first driving display 200 and the second driving display 250 is described in detail.

Figure 3:
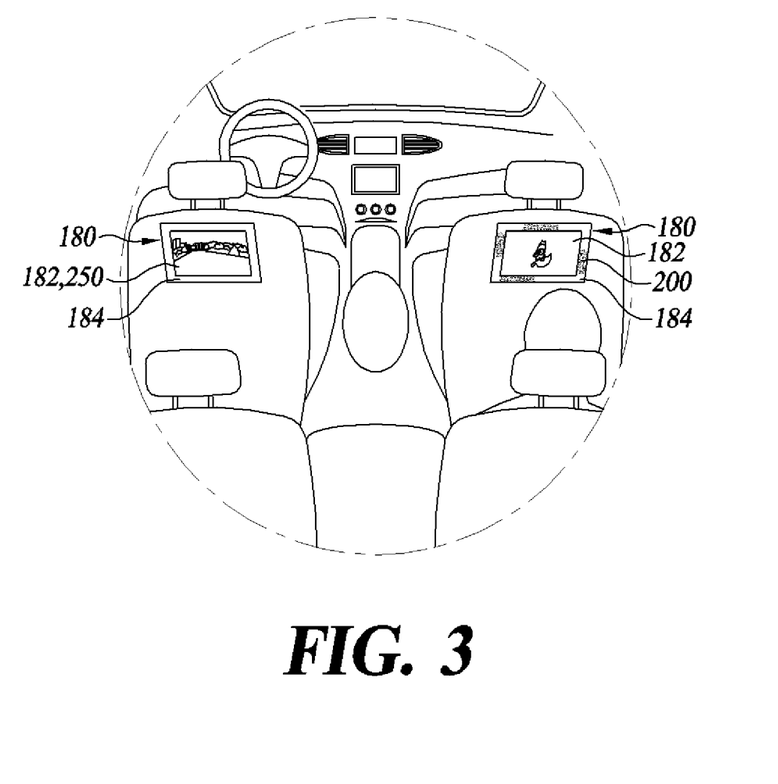
FIG. 3 is a diagram illustrating driving displays outputted to the display apparatuses according to an embodiment of the present disclosure when the vehicle turns right.

FIG. 3 is a diagram illustrating driving displays outputted to the display apparatuses according to an embodiment of the present disclosure when the vehicle turns right.

Referring to FIG. 3, when the vehicle turns right, the first driving display 200 displayed in the edge display area 184 of the display panel 180 used by a passenger may be moved along the circumference of the display panel 180.

FIG. 3 illustrates that in order to indicate the right turn of the vehicle, a left gradation color is moved upward, a right gradation color is moved downward, and a lower gradation color and an upper gradation color are moved to the left. This illustrates a direction of a force felt by a passenger when the vehicle turns right.

A case where the vehicle turns left is not illustrated. However, compared to the case of the right turn, the left turn of the vehicle may be displayed by moving each gradation color in an opposite direction.

Furthermore, when the vehicle turns right while moving forward, the lower gradation color may be more moved to the left end than the upper gradation color. When the vehicle turns right while moving backward, the upper gradation color may be more moved to the left end than the lower gradation color.

When the vehicle turns right, the second driving display 250 displayed in the main display area 182 of the display panel 180 not used by a passenger may be rotated.

FIG. 3 illustrates that in order to indicate the right turn of the vehicle, a driving image is clockwise rotated. When the vehicle turns left, the driving image may be counterclockwise rotated.

Figure 4:
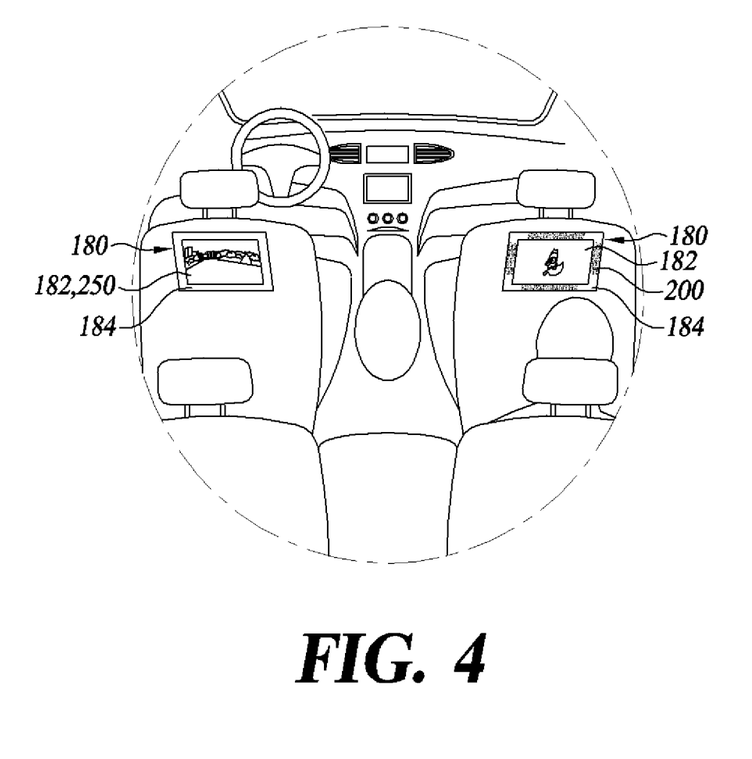
FIG. 4 is a diagram illustrating driving displays outputted to the display apparatuses according to an embodiment of the present disclosure when the vehicle is decelerated.

FIG. 4 is a diagram illustrating driving displays outputted to the display apparatuses according to an embodiment of the present disclosure when the vehicle is decelerated.

Referring to FIG. 4, when the vehicle is decelerated, the first driving display 200 displayed in the edge display area 184 of the display panel 180 used by a passenger may be moved along the circumference of the display panel 180, and the size thereof may be increased.

FIG. 4 illustrates that in order to indicate the deceleration of the vehicle, the sizes of left and right-side gradation colors are increased and simultaneously upward moved, and upper and lower-side gradation colors are not moved, but the sizes thereof are increased. This indicates the size and direction of a force felt by a passenger when the vehicle is decelerated.

A case where the vehicle is accelerated is not illustrated. However, compared to the deceleration, the acceleration of the vehicle may be displayed by moving each gradation color with the same size in an opposite direction.

When the vehicle is decelerated, the size of the second driving display 250 displayed in the main display area 182 of the display panel 180 not used by a passenger may be decreased.

FIG. 4 illustrates that in order to display the deceleration of the vehicle, the size of a driving image is reduced and simultaneously the driving image is moved downward on the main display area 182. When the vehicle is accelerated, the size of the driving image may be reduced and simultaneously the driving image may be moved upward on the main display area 182.

A passenger may watch an image watched by the passenger without any change through the first driving display 200 and the second driving display 250 changing as described above, and may simultaneously recognize a driving state of the vehicle. Accordingly, a motion sickness symptom, such as vomiting or sickness, can be minimized because a passenger can recognize a driving state of a vehicle while watching a desired image.

Furthermore, an image watched by a passenger is outputted to the main display area 182, and the first driving display 200 is outputted to the edge display area 184. Accordingly, the location and size of the image watched by the passenger are not changed, and thus a feeling of immersion of the passenger can be maintained.

The methods for indicating driving states of a vehicle illustrated in FIGS. 3 and 4 are merely examples, and may include various driving display methods as long as a passenger is made to recognize a driving state of a vehicle.

Figure 5:
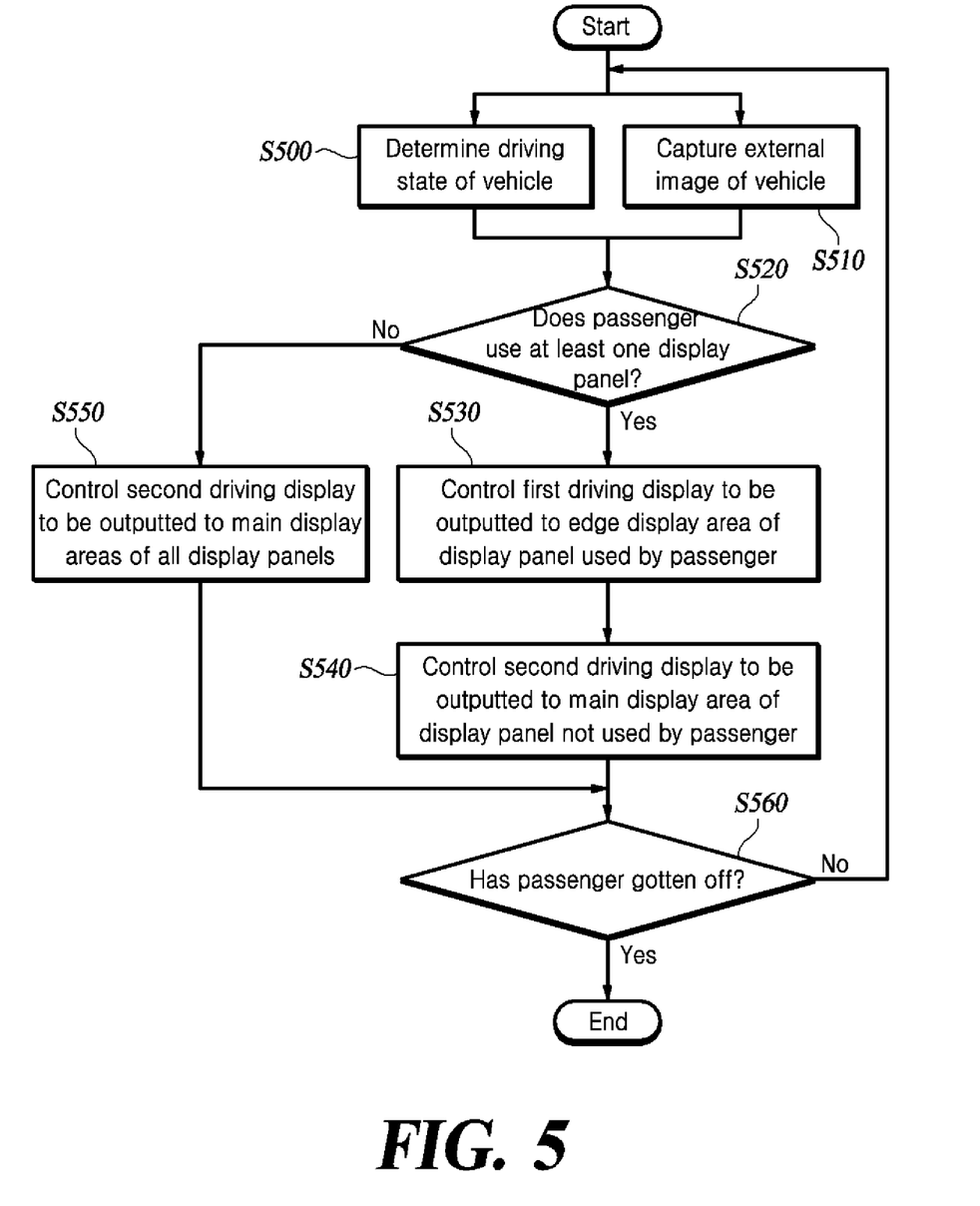
FIG. 5 is a flowchart illustrating a method of controlling the display apparatus according to an embodiment of the present disclosure.

FIG. 5 is a flowchart illustrating a method of controlling the display apparatus according to an embodiment of the present disclosure.

Referring to FIG. 5, the integrated control unit 160 determines a driving state of the vehicle (S500). The external camera 140 captures an external image of the vehicle (S510). The integrated control unit 160 determines whether a passenger uses at least one display panel 180 (S520).

A detailed description of determining a driving state of the vehicle and whether a passenger uses the display panel 180 has been given above, and is omitted herein.

If the integrated control unit 160 determines that the passenger uses the at least one display panel 180, the integrated control unit 160 controls the first driving display 200 to be outputted to the edge display area 184. For example, if the number of display panels 180 is one, the integrated control unit 160 controls an image selected by the passenger to be outputted to the main display area 182 and the first driving display 200 to be outputted to the edge display area 184.

If the number of display panels 180 is plural, the integrated control unit 160 controls an image selected by the passenger to be outputted to the main display area 182 of the display panel 180 used by the passenger and controls the first driving display 200 to be outputted to the edge display area 184 (S530). Furthermore, the integrated control unit 160 controls the second driving display 250 to be outputted to the main display area 182 of the display panel 180 not used by the passenger (S540).

A detailed description related to the first driving display 200 and the second driving display 250 has been given above, and is omitted herein.

If the integrated control unit 160 determines that the passenger does not use the at least one display panel 180, the integrated control unit 160 controls the second driving display 250 to be outputted to the main display areas 182 of all the display panels 180 (S550).

The integrated control unit 160 determines whether the passenger has gotten off (S560). If the passenger has not gotten off, the integrated control unit 160 continuously determines the driving state of the vehicle (S500) and the external camera 140 continuously captures the external image of the vehicle (S510). If the passenger has gotten off, the control process is terminated.

As described above, according to the display apparatus 10 and the method of controlling the same according to the embodiments of the present disclosure, there are effects in that a feeling of immersion and ride comfort can be improved because an influence on an image watched by a passenger can be minimized and a motion sickness symptom of the passenger can also be prevented.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A display apparatus comprising:
a display panel provided within a vehicle and comprising a main display area and an edge display area disposed along a boundary of the main display area; and
an integrated controller configured to control the display panel to cause a first driving display, corresponding to a driving state of the vehicle, to be outputted to the edge display area in response to a determination that a passenger is using the display panel, wherein the first driving display is configured to show a change in a location or a size of a plurality of gradation colors that are each displayed in an upper area, a lower area, a left area, and a right area of the edge display area, wherein the plurality of gradation colors are spaced apart from each other so that no overlap occurs between the plurality of gradation colors.

2. The display apparatus of claim 1, wherein the integrated controller is further configured to control a second driving display, corresponding to the driving state of the vehicle, to be outputted to the main display area in response to a determination that the passenger is not using the display panel.

3. The display apparatus of claim 2, wherein:
the second driving display is configured to show a change in a location, an angle, or a size of a driving image displayed in the main display area; and
the driving image includes an external image captured by an external camera of the vehicle or a preset background image.

4. The display apparatus of claim 1, further comprising a plurality of the display panels, wherein, in response to a determination that the passenger uses at least one of the plurality of display panels, the integrated controller is configured to control a second driving display, corresponding to the driving state of the vehicle, to be outputted to main display areas of remaining ones of the plurality of display panels not being used by the passenger.

5. The display apparatus of claim 4, wherein:
the second driving display is configured to show a change in a location, an angle, or a size of a driving image displayed in the main display area; and
the driving image includes an external image captured by an external camera of the vehicle or a preset background image.

6. The display apparatus of claim 1, wherein the integrated controller is configured to determine whether the passenger uses the display panel by using an in-vehicle camera or an eye sensor of the vehicle.

7. The display apparatus of claim 1, wherein the integrated controller is configured to determine the driving state of the vehicle by using an acceleration value measured by an acceleration sensor of the vehicle or a driving control value based on autonomous driving control.

8. A vehicle comprising:
a vehicle body;
a camera configured to capture an image outside the vehicle;
vehicle seats disposed inside the vehicle body;
a display panel provided within the vehicle body and comprising a main display area and an edge display area disposed along a boundary of the main display area; and
an integrated controller configured to, in response to a determination that a passenger is using the display panel, control the display panel to cause a first driving display, corresponding to a driving state of the vehicle, to be outputted to the edge display area in response to a determination that the passenger is using the display panel, wherein the first driving display is configured to show a change in a location or a size of a plurality of gradation colors that are each displayed in an upper area, a lower area, a left area, and a right area of the edge display area, wherein the plurality of gradation colors are spaced apart from each other so that no overlap occurs between the plurality of gradation colors.

9. The vehicle of claim 8, wherein the integrated controller is further configured to control a second driving display, corresponding to the driving state of the vehicle, to be outputted to the main display area in response to a determination that the passenger is not using the display panel.

10. The vehicle of claim 8, wherein the integrated controller is configured to determine whether the passenger uses the display panel based on an input from the camera.

11. The vehicle of claim 8, further comprising an acceleration sensor, wherein the integrated controller is configured to determine the driving state of the vehicle by using an acceleration value measured by the acceleration sensor.

12. The vehicle of claim 8, wherein the vehicle is an autonomous vehicle.

13. The vehicle of claim 12, wherein the integrated controller is configured to determine the driving state of the vehicle by using a driving control value based on autonomous driving control.

14. A method of controlling a display panel provided within a vehicle, the display panel comprising a main display area and an edge display area disposed along a boundary of the main display area, the method comprising:
determining whether a passenger uses the display panel;
determining a driving state of the vehicle; and
controlling a first driving display, corresponding to the driving state of the vehicle, to be outputted to the edge display area in response to a determination that the passenger uses the display panel, wherein the first driving display is implemented by using a change in a location or a size of a plurality of gradation colors each displayed in an upper area, a lower area, a left area, or a right area of the edge display area, wherein the plurality of gradation colors are spaced apart from each other so that no overlap occurs between the plurality of gradation colors.

15. The method of claim 14, further comprising controlling a second driving display, corresponding to the driving state of the vehicle, to be outputted to the main display area in response to a determination that the passenger does not use the display panel.

16. The method of claim 15, wherein:
the second driving display is implemented by using a change in a location, an angle, or a size of a driving image displayed in the main display area; and
the driving image includes an external image captured by an external camera of the vehicle or a preset background image.

17. The method of claim 14, wherein the display panel is provided in plural, and wherein the method further comprises, in response to a determination that the passenger uses at least one of the display panels, controlling a second driving display, corresponding to the driving state of the vehicle, to be outputted to main display areas of remaining display panels of the display panels that are not being used by the passenger.

18. The method of claim 17, wherein:
the second driving display is implemented by using a change in a location, an angle, or a size of a driving image displayed in the main display area; and
the driving image includes an external image captured by an external camera of the vehicle or a preset background image.

19. The method of claim 14, wherein determining whether the passenger uses the display panel comprises using an in-vehicle camera or eye sensor of the vehicle.

20. The method of claim 14, wherein determining the driving state of the vehicle comprises using an acceleration value measured by an acceleration sensor of the vehicle or a driving control value based on autonomous driving control.

* * * * *